(12) United States Patent
Li et al.

(10) Patent No.: US 8,116,794 B2
(45) Date of Patent: Feb. 14, 2012

(54) CHANNEL IMPULSE RESPONSE EXTRACTION FOR MOBILE TERMINALS (75) Inventors: Feng Li, Shanghai (CN); Jianxun Sun, Shanghai (CN); Yingmin Wang, Shanghai (CN); Guiliang Yang, Shanghai (CN); Tiezhu Xu, Shanghai (CN)

(73) Assignee: Shanghai Ultimate Power Communications Technology Co., Ltd., Shanghai (CN)

( * ) Notice: Subject to any disclaimer, the term of this patent is extended or adjusted under 35 U.S.C. 154(b) by 998 days.

(21) Appl. No.: 11/969,790

(22) Filed: Jan. 4, 2008

(65) Prior Publication Data

US 2008/0167030 A1   Jul. 10, 2008

Related U.S. Application Data (63) Continuation of application No. PCT/CN2006/001485, filed on Jun. 28, 2006.

(30) Foreign Application Priority Data

Apr. 4, 2005   (CN) .......................... 2005 1 0080643

(51) Int. Cl.
*H04B 7/00* (2006.01)

(52) U.S. Cl. ...................... 455/506; 455/452.2; 455/504; 375/148; 375/343; 375/260; 375/219; 375/224

(58) Field of Classification Search ............... 455/452.2, 455/504, 506; 375/148, 343, 260, 219, 224
See application file for complete search history.

(56) References Cited

U.S. PATENT DOCUMENTS

| | | | | |
|---|---|---|---|---|
| 6,400,779 B1 * | 6/2002 | White | ........................... | 375/343 |
| 2004/0229637 A1 * | 11/2004 | Wang et al. | ................... | 455/506 |
| 2005/0008088 A1 * | 1/2005 | Liu et al. | ....................... | 375/260 |
| 2005/0163262 A1 * | 7/2005 | Gupta | ........................... | 375/343 |
| 2005/0163265 A1 * | 7/2005 | Gupta | ........................... | 375/343 |
| 2006/0013326 A1 * | 1/2006 | Yoshida | ....................... | 375/260 |
| 2007/0041432 A1 * | 2/2007 | Reial | ........................... | 375/148 |
| 2007/0195864 A1 * | 8/2007 | Jonsson et al. | ................ | 375/148 |

(Continued)

FOREIGN PATENT DOCUMENTS

CN   1585318   2/2005

(Continued)

OTHER PUBLICATIONS

Office Action for Japanese patent application No. 2008-519781, dated Jan. 18, 2011 (3 pages).

(Continued)

*Primary Examiner* — Lester Kincaid
*Assistant Examiner* — Mehmood B Khan
(74) *Attorney, Agent, or Firm* — Hamre, Schumann, Mueller & Larson, P.C.

(57) ABSTRACT

Finding a channel impulse response estimation window in a current cell for at least one mobile terminal in a neighboring cell is disclosed. This can serve to mitigate interference caused by mobile terminals in neighboring cells in and among communications ongoing in a current cell. In one example, a method for A method for determining such a channel impulse response estimation window includes presetting, in the neighboring cell, at least two channel impulse response peak locations of respective mobile terminals in first and second predetermined periods with a predetermined peak location change pattern, and then upon receiving communication from a mobile terminal of the neighboring cell, analyzing channel impulse responses to identify the peak location change pattern with regard to first and second peak locations. The method further includes identifying a variation range for a channel impulse response of a primary path of the mobile terminal, and determining a channel impulse response estimation window for the mobile terminal based on the identified variation range and a preferred estimation window size.

26 Claims, 4 Drawing Sheets

U.S. PATENT DOCUMENTS

2008/0247476 A1* 10/2008 Pirot .............................. 375/260
2009/0190675 A1* 7/2009 Ling et al. ..................... 375/260

FOREIGN PATENT DOCUMENTS

| | | |
|---|---|---|
| EP | 1276248 | 1/2003 |
| JP | 7297806 | 11/1995 |
| JP | 9130326 | 5/1997 |
| JP | 10145327 | 5/1998 |
| JP | 2002506594 | 2/2002 |
| JP | 2002506595 | 2/2002 |
| JP | 2003143054 | 5/2003 |
| JP | 2003174400 | 6/2003 |
| JP | 2003174431 | 6/2003 |
| JP | 2007505532 | 3/2007 |
| JP | 2007528171 | 10/2007 |
| WO | 02/25837 | 3/2002 |

OTHER PUBLICATIONS

Extended European search report for European patent application No. 06761324.0, dated Mar. 18, 2011 (5 pages).

First Examination Report for Indian patent application No. 96/MUMNP/2008, dated Mar. 31, 2011 (2 pages).

T. Kawamura et al., "Throughput Comparison between Multipath Interference Canceller and Multipath Equalization Type Single User Detector with Multipath Interference Cancellation from Neighboring Sites in HSDPA," Proceedings of the 2002 IEICE General Conference, Mar. 2002 (5 pages).

* cited by examiner

CHANNEL IMPULSE RESPONSE EXTRACTION FOR MOBILE TERMINALS

REFERENCE TO RELATED APPLICATION(S)

This application is a continuation of PCT/CN2006/001485, filed Jun. 28, 2006, that claims the benefit of the priority date of Chinese Patent Application No. 200510080643.2, filed on Jul. 4, 2005, the contents of both of which are herein incorporated by reference in their entireties.

FIELD

The disclosure herein relates generally to wireless communication systems, and more particularly to a method and system for extracting channel impulse response for mobile terminals from a neighboring cell in a wireless communications system.

BACKGROUND

In cellular telephone or other wireless voice or data systems, a served area is divided into cells, each of which may be further divided into sectors. Each cell may be served by a single base station, which is further connected to a message switching center (MSC), a subscriber management system (SMS), or a data router via a base station controller (BSC). A plurality of wireless communication devices/terminals are connected to the MSC, the SMS, or the router by establishing radio links with one or more nearby base stations.

In earlier cellular telephone technology, such as time division multiple access (TDMA), as a wireless mobile terminal travels from one cell to another, the radio link between the terminal and the base station serving the first cell had to be broken and then replaced by a radio link between the terminal and the base station serving the second cell. In contrast, in a code division multiple access (CDMA) cellular telephone system, because the same frequency band is used for all cells and sectors, the first link need not be broken before connecting with the second link.

In a Code Division Multiple Access (CDMA) system, signals from a plurality of mobile terminals are mixed and overlapped in time and frequency domains. Since certain correlations exist between signals of individual mobile terminals, signals of different mobile terminals at the receiving end will interfere with each other, and such interference is commonly called Multi-Access Interference (MAI). Although the MAI generated by a mobile terminal is very small, as the number of mobile terminals or signal power increases, MAI becomes one of major interferences in a CDMA system.

A TD-SCDMA system inhibits the MAI through a technique called multi-mobile terminal joint detection in order to increase anti-interference ability of the system. Multi-mobile terminal joint detection no longer treats signals from other terminals blindly as interference signals. Instead, it fully utilizes midamble information included in the received signals, such as the channel impulse response of each mobile terminal, and concurrently extracts signals of all the mobile terminals from the received signals. With the multi-mobile terminal joint detection, anti-interference ability of TD-SCDMA systems is largely enhanced, as well as system capacity and coverage.

In the current multi-mobile terminal joint detecting technique, the TD-SCDMA system firstly determines impulse responses of mobile terminals based on a predetermined training sequence known as a midamble sent by the mobile terminals in normal timeslots, and determines respective channel estimation windows of the mobile terminal based on cyclic offsets of the midamble. Upon determining the location of respective channel estimation windows of the mobile terminals, a base station is able to extract channel impulse responses of the mobile terminals from the channel impulse responses of the mobile terminals under its coverage. Thereafter, the multi-mobile terminal joint detection can be performed based on the channel impulse responses of the mobile terminals.

One prerequisite for performing multi-mobile terminal joint detection is that the channel impulse responses of the mobile terminals must first be obtained. In the TD-SCDMA system, each timeslot of each subframe includes two data fields and one training sequence field. The midamble distributed by the system is sent in the training sequence field of an uplink timeslot, so as to allow the base station to perform channel estimation and synchronization control. The TD-SCDMA system assigns a basic midamble for each cell, where different cells use different basic midamble which have certain orthogonal characteristics. Midambles used by different mobile terminals in the same cell are obtained by cyclic shifting or offsetting the basic midamble of the cell, and the cyclic offsets of different mobile terminals are different. Thus, the base station can simultaneously estimate the channel impulse responses of all mobile terminals in the current cell by distinguishing midambles sent by mobile terminals in the current cell and those of neighboring cells by certain operations through the use of basic midamble of the current cell. Since the midambles used by different mobile terminals in the same cell have different cyclic offsets, thus the channel impulse responses of different mobile terminals in the same cell will have different time delays. In order to receive and detect signals from various mobile terminals, their channel impulse responses are obtained and processed through various corresponding channel estimation windows. That is, the channel impulse responses of different mobile terminals in the same cell should be located at different channel estimation windows. Respective channel estimation windows of mobile terminals can be determined by the cyclic offset of midamble used by the respective mobile terminal. After the channel estimation window of each mobile terminal is determined, the base station can respectively segment the channel impulse response of each individual mobile terminal from the channel impulse responses of all mobile terminals in the current cell. The multi-mobile terminal joint detection can then be performed based on each mobile terminal's channel impulse response.

However, it can be seen from the above process of determining channel impulse responses, a base station currently can only determine the uplink channel impulse responses of all mobile terminals in its cell, and therefore, can only perform multi-mobile terminal joint detection on uplink signals of all mobile terminals in the current cell. In a particular cell, since the mobile terminals from the neighboring cells are synchronized with the base stations in the corresponding neighboring cells, they, and other received uplink signals of mobile terminals from the neighboring cells are entirely treated as unknown MAIs.

What is needed is an improved method and system for effectively reducing multi-cell interferences by identifying impulse responses of a mobile terminal from a neighboring cell for effectively reducing MAI and achieving better communication quality.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Finding a channel impulse response estimation window in a current cell for at least one mobile terminal in a neighboring cell is disclosed. This can serve to mitigate interference caused by mobile terminals in neighboring cells in and among communications ongoing in a current cell. In one example, a method for A method for determining such a channel impulse response estimation window includes presetting, in the neighboring cell, at least two channel impulse response peak locations of respective mobile terminals in first and second predetermined periods with a predetermined peak location change pattern, and then upon receiving communication from a mobile terminal of the neighboring cell, analyzing channel impulse responses to identify the peak location change pattern with regard to first and second peak locations. The method further includes identifying a variation range for a channel impulse response of a primary path of the mobile terminal, and determining a channel impulse response estimation window for the mobile terminal based on the identified variation range and a preferred estimation window size.

To the accomplishment of the foregoing and related ends, the following description and annexed drawings set forth certain illustrative aspects and implementations. These are indicative of but a few of the various ways in which one or more aspects may be employed. Other aspects, advantages, and novel features will become apparent from the following detailed description when considered in conjunction with the annexed drawings.

DETAILED DESCRIPTION

The following discussion is now made with reference to the drawings, wherein like reference numerals are used to refer to like elements throughout. In the following description, for purposes of explanation, numerous specific details are set forth in order to provide a more thorough understanding. It may be evident, however, that the claimed subject matter may be practiced with or without these specific details. In other instances, well-known structures and devices are illustrated in block diagram, or other, form to facilitate the description.

Although the discussion herein is had with regard to a few limited examples, it is understood that the disclosure is applicable to any multiple access technologies which implement frequency division for multiple access channelization. Such access technologies include, but are not limited to, Frequency Division Multiple Access (FDMA), Time Division Multiple Access (TDMA), Multi-Carrier Code Division Multiple Access (MC-CDMA), and/or Orthogonal Frequency Division Multiplex Multiple Access (OFDM-MA) and any combinations thereof, whether synchronized and/or unsynchronized using Frequency Division Duplex (FDD) and/or Time Division Duplex (TDD), for example.

Figure 1:
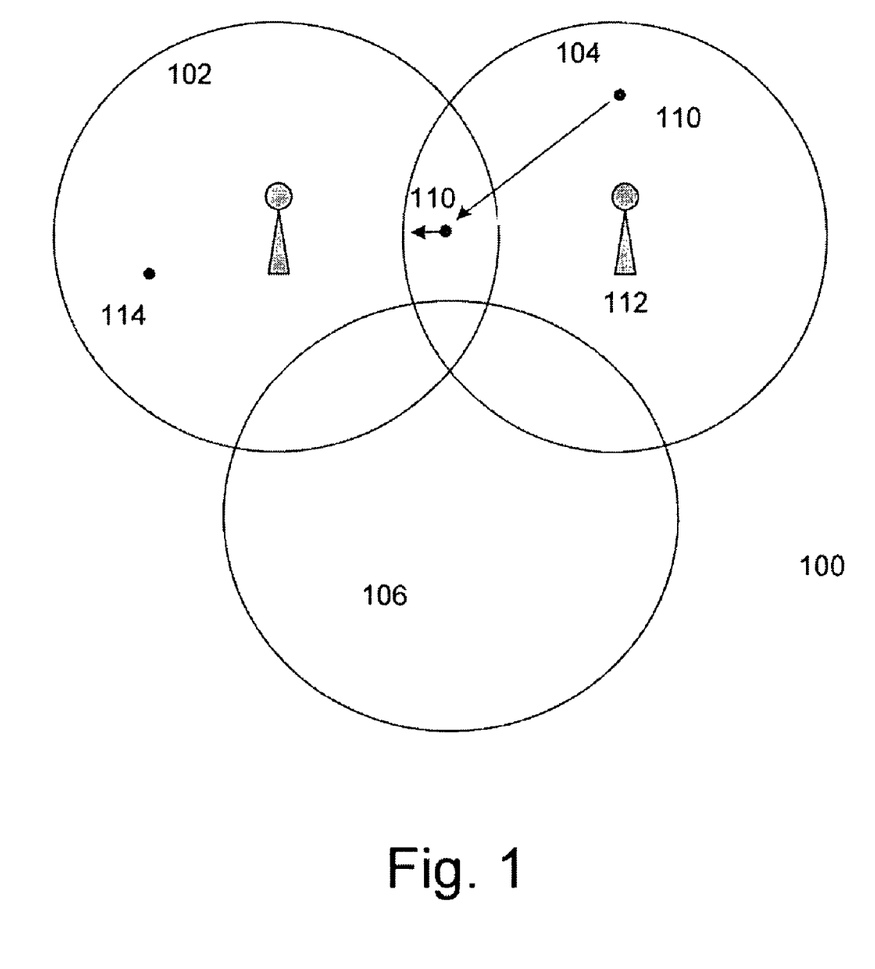
FIG. 1 is a schematic diagram illustrating a telecommunication network.

FIG. 1 illustrates a wireless communication network 100. As an example, there are three neighboring cells 102, 104, and 106 illustrated in the network. Typically, a base transceiver station (BTS) situated at the center of each cell is responsible for communicating with the mobile terminals within the boundaries of the cell.

When a mobile terminal 110 of cell 104 moves towards cell 102, as the mobile terminal 110 moves farther and farther away from the base station 112, it will continuously increase its transmission power in order to maintain the communication quality. As such, the uplink signal transmitted by the mobile terminal 110 generates an increasing amount of Multi-Access Interference (MAI) to the mobile terminals in neighboring cells.

In order to suppress the interference from the uplink signal of the mobile terminal 110, mobile terminals in the neighboring cell 102 will, for example, also increase their transmission powers to maintain their communication qualities. They in turn generate more MAI to their respective neighboring cells, which will further cause the mobile terminals in cells 104 and 106, such as mobile terminal 110 to further increase its transmission power. As such, an inter-cell power increase inducement feedback is formed, causing the interference level of the entire network to continually increase. This ultimately leads to a decrease in overall system capacity and quality due to limited transmission power, for example.

Presently, base stations only perform multi-mobile terminal joint detection on uplink signals of mobile terminals within their respective cells. As such, uplink signals received from mobile terminals in neighboring cells are treated as unknown MAI. Thus, current multi-mobile terminal joint detecting techniques merely suppress MAI from mobile terminals in the same cell, but do not account for MAI from mobile terminals in neighboring cells.

As explained above, if a base station can identify parameters (such as scrambling codes, code channels, basic midambles and/or channel impulse responses etc.) used by mobile terminals in the same-frequency neighboring cells that cause MAI in the current cell, the base station can perform a multi-mobile terminal joint detection on uplink signals of mobile terminals in the current cell and from the neighboring cells. As a result, the base station can significantly reduce interference, thereby improving the system quality and capacity.

For a base station in a particular cell, information such as scrambling codes, code channels and/or basic midambles of the neighboring cells can be obtained from system configuration. Thus, in order to allow mobile terminals from the neighboring cells to participate in the joint detection, it is important to obtain accurate channel impulse responses from the mobile terminals in neighboring cells.

In a TD-SCDMA system, since each mobile terminal is synchronized with the cell in which the mobile terminal is located, communications from the mobile terminals of the neighboring cells are most likely not synchronized with the current cell. Although it is easy for a base station to identify the channel estimation windows of mobile terminals in its own cell, it is not easy to detect the channel estimation windows of mobile terminals from the neighboring cells. As a result, reliable channel impulse responses of mobile terminals of the neighboring cells cannot be obtained. The disclosure herein provides for determining windows for identifying channel impulse responses of mobile terminals from the neighboring cells.

As stated above, each mobile terminal maintains uplink reception synchronization with other mobile terminals in the current cell via a so-called uplink synchronization control. For a mobile terminal from a neighboring cell, synchronization is maintained with its own cell, but not with the current cell. Moreover, channel estimation windows are unknown due to the fact that the transmission distances are different from one mobile terminal to another as one may be further away from the base station than another. For mobile terminals of the current cell, the estimation windows for the channel impulse responses are fixed. For the mobile terminals of neighboring cells, although their estimation windows are unpredictable because the time at which signals from the mobile terminals of neighboring cells reach the current cell are disordered and unknown, for mobile terminals from a particular cell, the relative locations of the estimation windows remain the same since they are still under effective synchronization control of the respective neighboring cells. What is needed is a way to identify the estimation window of one reference mobile terminal from a predetermined neighboring cell, and then the rest of the estimation windows of the mobile terminals from the same neighboring cell can be discerned based on the determinable relative locations between any two. It is understood that the selected mobile terminal is not the only choice for the reference mobile terminal as long as a reference terminal can be pre-configured to be readily identified on the receiving end.

A technique is described herein that artificially generates a predetermined characteristic variation in channel impulse response peak locations and estimates the channel response estimation windows of mobile terminals from a neighboring cell based on these variations such that the channel impulse responses of the mobile terminals from the neighboring cell can be determined for joint detection.

Figure 2:
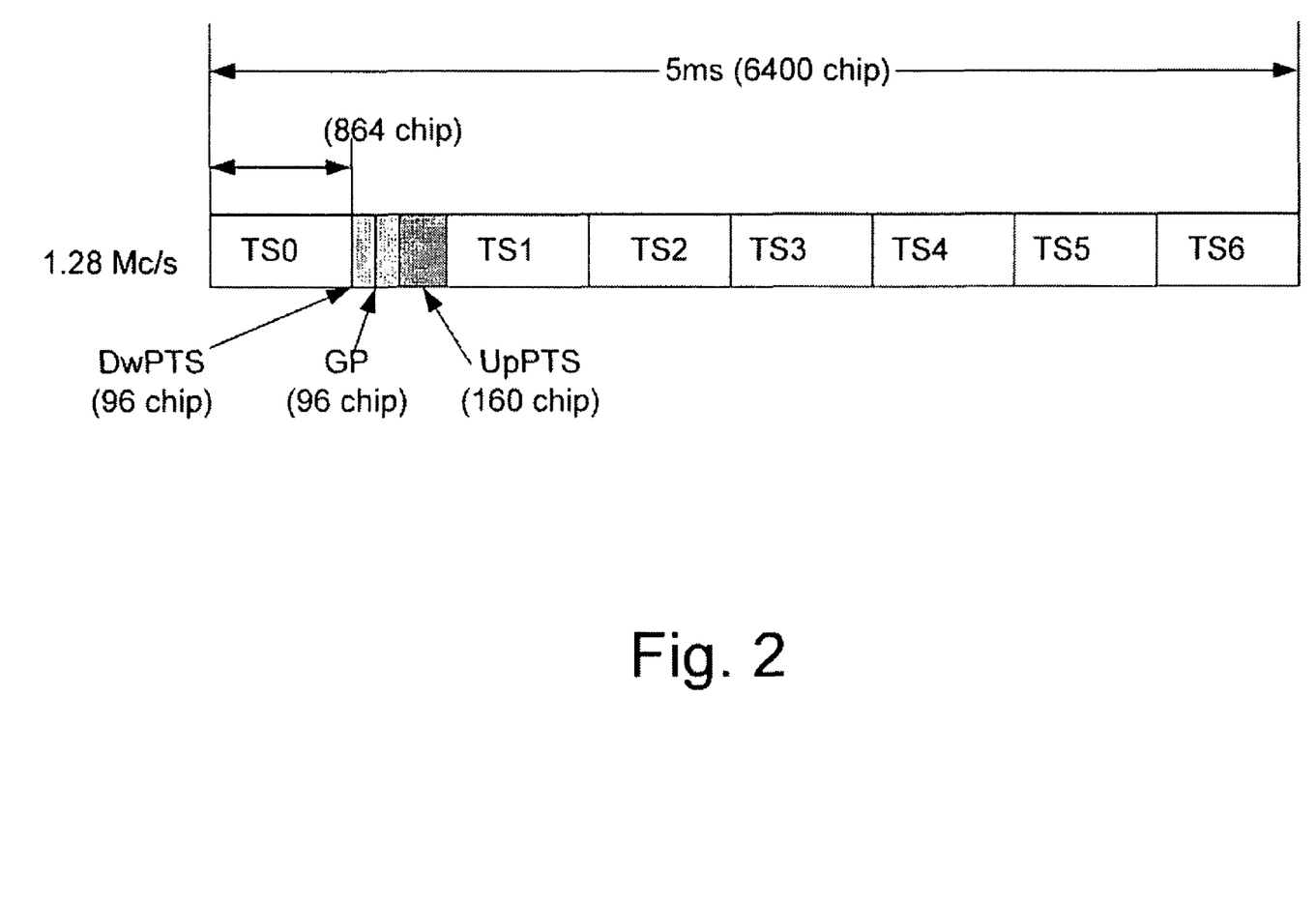
FIG. 2 illustrates a TD-SCDMA frame structure for communications in a telecommunication network.

FIG. 2 illustrates a frame structure of a TD-SCDMA system. As illustrated in FIG. 2, each frame of the TD-SCDMA system includes 7 basic timeslots (TSO, TS1, . . . , TS6) and 3 special timeslots (e.g., Downlink Pilot Time Slot DwPTS, Guard Period GP and Uplink Pilot Time Slot UpPTS). Each basic timeslot includes two data fields and one training sequence field. Users transmit traffic data on the data fields and transmit system assigned midamble on the training sequence field of an uplink timeslot to allow a base station to perform channel estimation and synchronization control. The TD-SCDMA system assigns a basic midamble for each cell, where different cells use different basic midambles with certain orthogonal characteristics so that cell-to-cell interference is reduced. Midambles used by different mobile terminals in the same cell are obtained by cyclic shifting the basic midamble of the cell. As such, the cyclic offsets of different mobile terminals are different but bear a predetermined relation with each other. Thus, the base station can concurrently estimate the channel impulse responses of mobile terminals in the current cell by distinguishing midambles sent by mobile terminals since it is clearly informed of the basic midamble of the current cell. The channel impulse responses of different mobile terminals in the same cell can be located at different channel estimation windows. The channel estimation windows of mobile terminals can be determined based on the unique cyclic offset of the midamble used by respective mobile terminals. For example, assuming that the cyclic offset of each mobile terminal relative to the previous mobile terminal is 16 chips and the total length of the channel impulse response is 128 chips, the estimation window of the first mobile terminal is set to be the beginning 16 chips of responses received from mobile terminals in the current cell. The second mobile terminal will have the next 16 chips for its estimation window. Based on this principle, the $1^{st}$~$16^{th}$ chips corresponding to the channel impulse response of nth mobile terminal can be represented and identified as $(n-1)*16^{th}$+ $1$~$n*16^{th}$ chips. Generally, a channel impulse response peak location is set at the first ⅓ or ½ of the estimation window so that the channel impulse response of each mobile terminal does not exceed the range of the estimation window. For example, if the length of an estimation window is 16 chips long, the channel impulse response peak location is normally from the $6^{th}$ to $8^{th}$ chip.

As described herein predetermined change patterns are provided for the advancement of transmission times for mobile terminals so that there is a unique correlation for respective mobile terminals and their channel impulse responses based on at least two response peak locations. Based on such unique correlation, channel impulse response estimation windows can be determined appropriately.

For example, it is assumed that for each mobile terminal, the advancement of transmission time is set so that two channel impulse response peak locations are identifiable. It is further assumed that the system frame period is N, channel impulse response peak locations are T1 and T2 wherein T1<T2, and their corresponding periods are M1 and M2. For simplifying the illustration, it is further assumed that mod(N, M1+M2)=0, e.g. N is an integer multiple of (M1+M2).

Figure 3A:
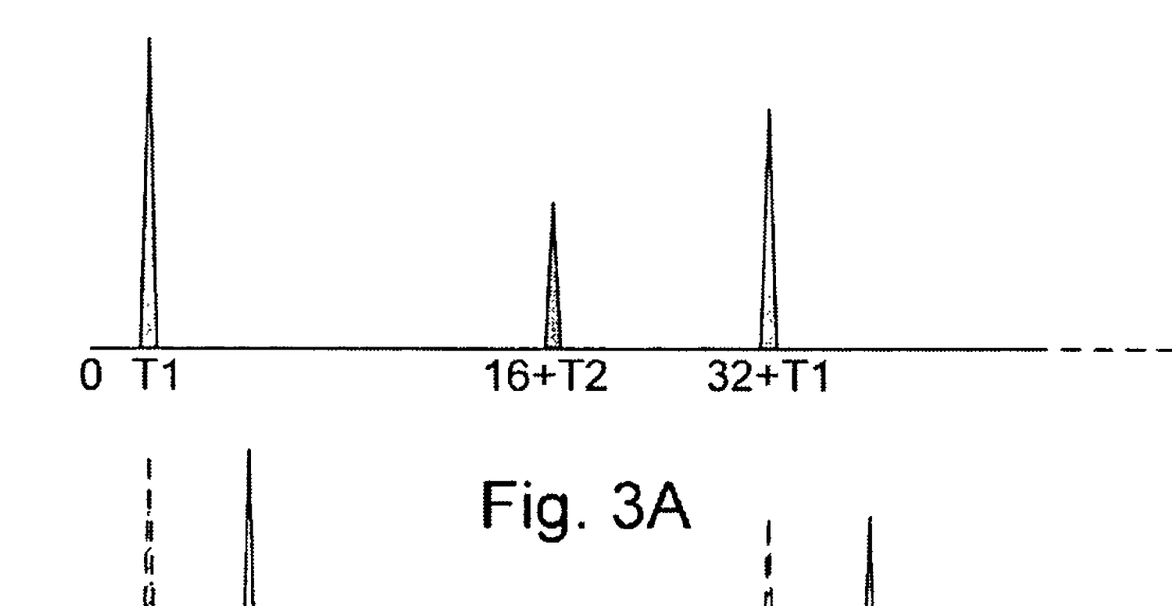
FIGS. 3A-3B are diagrams illustrating setting peak locations for channel impulse responses of a mobile terminal as described herein.
Figure 3B:
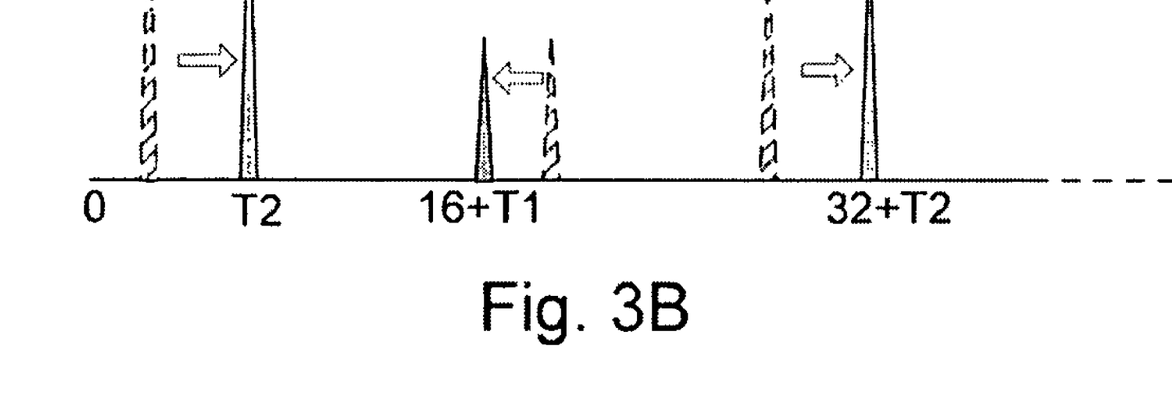

FIGS. 3A-3B illustrate configurations of channel impulse response peak locations according to one embodiment of the present disclosure. With regard to FIGS. 3A and 3B, when 0<=mod(sub_sfh, (M1+M2)*2)<M1 wherein sub_sfh is the sub-system frame number, it is so configured that the first channel impulse response peak location of the first mobile terminal corresponding to the first shifting sequence of the basic midamble is stabilized at T1. With regard to FIG. 3B, when M1<=mod(sub_sfh, (M1+M2)*2)<M1+M2, the second channel impulse response peak location of the first mobile terminal corresponding to the first shifting sequence of the basic midamble is set to T2, just a few chips away from T1. Through uplink synchronization control, the channel impulse response peak can be stabilized at T2. The distance between T1 and T2 can be referred to as a peak offset; important for determining the estimation window.

As stated above, if the length of the estimation window, $W_3$ is about 16 chips, the first channel impulse response peak location of the second mobile terminal corresponding to the second shifting sequence of the basic midamble can be set to T2+16 chips, and the third mobile terminal can be at T1+32 chips, etc.

Similar to setting up the first mobile terminal, the second channel impulse response peak location of the second mobile terminal can be intentionally set at T1+16 chips, and the second channel impulse response peak location of the third mobile terminal can be set to T2+32 chips. As illustrated, after the two peak locations of the first mobile terminal are set at T1 and T2, the subsequent pairs of peak locations can be set based on the relation represented by (n−1)*W+T2 and (n−1)*W+T1 and the relation represented by (n−1)*W+T1 and (n−1)*W+T2 alternately. That is, if nth mobile terminal uses (n−1)*W+T1 and (n−1)*W+T2 as its first and second peak locations, the (n+1)th or (n−1)th mobile terminal sets its first and second peak locations as ((n+1)−1)*W+T2 and ((n+1)−1)*W+T1, and ((n−1)−1)*W+T2 and ((n−1)−1)*W+T1 respectively. It is understood that the second peak can be placed differently as long as the relative location of such is known and/or conveyed to the base station. It is the unique relation between the first and second peaks of each mobile terminal that can be utilized to determine the channel estimation window.

Similar to the above, when M1+M2<=mod(sub_sm, (M1+M2)*2)<2*M1+M2, the channel impulse response peak location of the first mobile terminal corresponding to the first shifting sequence of the basic midamble is set to T2, and stabilized at T2 through the uplink synchronization control, the first peak of the second mobile terminal is set to T1, and the third one is set to T2, and so forth.

When 2*M1+M2<=mod(sub_sfn, (M1+M2)*2)<2*(M1+M2), the channel impulse response peak location of the first mobile terminal is set to $T1_s$ and that for the second mobile terminal is set to T2, and the third one is set to T1, and so forth. As such, the peak offset between the two peaks (e.g., the difference between T1 and T2) is maintained.

During this configuration process, few to no changes are required in the existing hardware setup of the communications system. The mobile terminals also do not need modifications. The configuration process can be administered by the base station. In order to perform the configuration, the base station and the mobile terminals coordinate on the values of the parameters such as T1, T2, M1 and M2 etc., and this can be accomplished through signaling. In one example, the preferred estimation window size is denoted by W (e.g., 16 chips).

It is understood that if the above configuration is done appropriately, for the nth mobile terminal from a particular neighboring cell in a particular time slot, the two peak locations should maintain the relation, e.g., the relation between (n−1)*W+T1 and (n−1)*W+T2. Due to the travel of signals, there will be a delay offset Δ that will be built in the signal received by the base station. That is, the (n−1)*W+T1 will become (n−1)*W+T1+Δ and (n−1)*W+T2 will become (n−1)*W+T2+Δ. However, for the mobile terminals from a neighboring cell, the delay offset should be the same. Therefore, the difference between two peak locations, e.g., [(n−1)*W+T1+Δ]~[(n−1)*W+T2+Δ] will still be the same as T1-T2; important for deciding the estimation window.

Once the system is configured, the base station can extract the unique peak offset between two peak locations (or peak change pattern) in the channel impulse response of a particular mobile terminal from the neighboring cell, and determine its estimation window.

The process of determining channel impulse response estimation windows can be sub-divided. First, channel impulse responses can be estimated in each timeslot based on the training sequence of the current cell and each neighboring cell. The channel impulse response contains channel impulse responses of the mobile terminals from the neighboring cell as well as the responses from the current cell. The channel impulse response is formed collectively by a series of response taps, which indicate sampling points at which the signal power exceeds a predetermined threshold power.

Then, a process is implemented to filter and keep certain response taps based on predetermined rules. For example, during time 0<=mod(sub_sfn, (M1+M2)*2)<M1 and the time M1+M2<=mod(sub_sfh, (M1+M2)*2)<2*M1+M2 (which can be referred to as the first and second stable response periods), a statistical response characteristics (such as power and distribution rate) of the response taps that show up in M1 time period with the entire 128 chips are examined. Based on signal-to-noise ratio, certain response taps are selectively kept. For example, if a measured noise power is Pn and a predetermined threshold value is Th_SNR(dB), and if the power of a certain tap Ptap is larger than the noise power plus the threshold value, e.g. Ptap>=Pn+Th_SNR, then this tap is a selected response tap. In examining the selected response taps, there will be various identifiable peak locations.

The statistical response characteristics derived from the first and second stable conditions are compared, and the peak offsets between peak locations are examined, the channel impulse response of a mobile terminal from the neighboring cell can then be identified based on the unique peak offset acknowledged. In addition, if any historical data is available that represents the statistical response characteristics, it can also be used to help the filtering process. It is understood that due to the existence of multi-paths, it needs to be determined whether a certain response tap is attributed to a multi-path. For example, the energy center point of a group of response taps representing multi-path taps can be used as a response from its primary path.

Now, with the channel response at hand, with the consideration of a possible range of the channel impulse response for the primary path for the mobile terminal from the neighboring cell, and that for the multi-path condition, the channel impulse response estimation window for the mobile terminal is then determined. As stated above, the estimation window should normally be smaller than 16 chips. As illustrated in FIGS. 3A and 3B, if the initial configuration is such that the direction of the shifting of the second peak is alternating, the determination of the estimation window should also take that into consideration. For example, if the second peak shifts forward from the first peak for the first mobile terminal, but shifts backward for the second mobile terminals, alternately then shifting forward again, the estimation window for the first mobile terminal should provide enough space (e.g., chips) to accommodate these changes.

Figure 4:
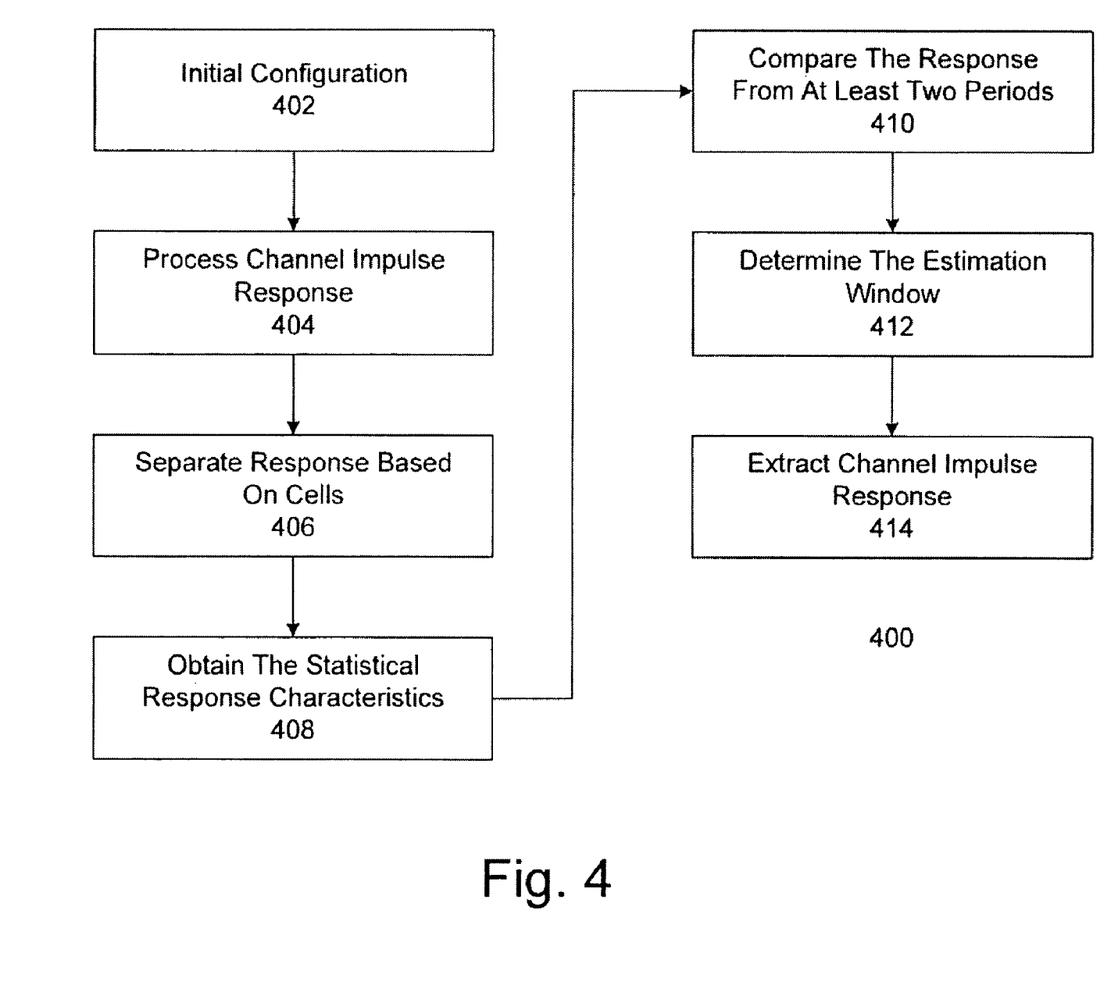
FIG. 4 is a flowchart illustrating an exemplary process for determining channel impulse responses for mobile terminals from neighboring cells as described herein.

FIG. 4 illustrates an exemplary process flow 400 for determining channel impulse response estimation windows for extracting channel impulse responses of mobile terminals from neighboring cells. At 402, an initial configuration is performed so that at least two predetermined peak locations for the mobile terminals for each cell are preset so that they present a change pattern for identifying the mobile terminal. In other words, the expected peak locations can be programmed and used as an index for finding the associated mobile terminal. For example, it can be configured so that the peak offset between the two peak locations for each cell is unique. This can be done by controlling the amount of transmission advancement time, for example. Different mobile terminals are expected to have their respective peak locations of the channel impulse responses spread out in different groups of chips, but the peak location for a particular mobile terminal should be stabilized on one of its corresponding expected peak locations. In one embodiment, the peak change pattern, which is the peak offset, for each mobile terminal is further maintained consistently within a cell. As an alternative, the peak offset can vary as long as the pattern for the peak locations for each mobile terminal is identifiable. For illustration purposes, it is assumed that the peak offset for each mobile terminal is expected to be the same through out the cell, and this can be done by the operation of the base station. The relevant peak offset information is conveyed to other cells so that each cell is aware of the unique peak patterns or peak offsets for its neighboring cell. Alternatively, said at least two predetermined peak locations can be the same for each mobile terminal, while the change patterns of each mobile terminal are different, so that each mobile terminal can be identified according to a preset change regulation.

At 404, when the base station receives and processes the channel impulse response with mobile terminals from the current cell as well as one or more neighboring cells based on a training sequence, the channel impulse response estimation window of the current cell is determined using conventional methods. At 406, the channel impulse response of each neighboring cell is separated based on different midables used. At 408, during the first and second stable response periods, statistical response characteristics are determined for a predetermined period of time for eliminating unneeded noises. In this predetermined period of time, responses taps are selectively filtered and remain for further processing based on a predetermined set of rules. At 410, the channel impulse response in the first stable response period and the second stable response period are compared and studied to identify the peak locations for each mobile terminal from the neighboring cell based on the unique peak offset. As a result, the channel impulse response of the primary path of the communication between the mobile terminal and the base station for each mobile terminal from each neighboring cell is identified. At 412, the estimation window for each mobile terminal is determined taking into consideration the variation range of the channel impulse response for the primary path. Once the estimation window is set, this window can be used to extract the channel impulse response for each mobile terminal from the neighboring cell at 414. With that information on hand, a joint detection process can be performed along with communications from mobile terminals so that interference from the neighboring cell can be subsequently reduced.

It is to be appreciated that while the above illustration uses one particular peak offset pattern (e.g., T1 and T2 are alternatively used for different mobile terminals), it is not to be limited to this example. Any preset change patterns that can be used for identifying the channel impulse response peak locations can be implemented as long as the base station and the mobile terminals are configured to perform accordingly. The change patterns of the peak locations for the mobile terminals can be designed in various ways as long as the resulting estimation window for each mobile terminal is identifiable from its neighboring estimation windows. It is further noted that once the channel impulse response estimation windows for mobile terminals from the neighboring cells are determined, a joint detection method can be performed in order to reduce the interferences from such mobile terminals from the neighboring cell. Such a joint detection method is disclosed in a co-pending PCT application whose application number is PCT/CN2005/001539, title is time slot CDMA multi-cell joint detection method, which is also assigned to the same assignee.

It will be appreciated that, as used in this application and appended claims, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Additionally, while one or more methods are illustrated and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising".

The invention claimed is:

1. A method for determining a channel impulse response estimation window in a current cell for at least one mobile terminal in a neighboring cell, comprising:
   presetting, in the neighboring cell, at least two channel impulse response peak locations of respective mobile terminals in first and second predetermined periods with a predetermined peak location change pattern;
   upon receiving communication from a mobile terminal of the neighboring cell, analyzing channel impulse responses to identify the peak location change pattern with regard to first and second peak locations;
   identifying a variation range for a channel impulse response of a primary path of the mobile terminal; and
   determining a channel impulse response estimation window for the mobile terminal based on the identified variation range and a preferred estimation window size,
   the presetting comprising:
   setting the first peak location as T1 and the second peak location as T2 for a first mobile terminal with T2>T1; and
   setting the first and second peak locations for each subsequent mobile terminal alternately based on a relation defined by $(n-1)*W+T2$ and $(n-1)*W+T1$ and a relation defined by $(n-1)*W+T1$ and $(n-1)*W+T2$, where W denotes the preferred estimation window size and n denotes the nth mobile terminal.

2. The method of claim 1, the change pattern is unique to respective mobile terminals provided that the corresponding channel impulse response estimation window is identifiable from neighboring estimation windows.

3. The method of claim 1, the first predetermined period is a period during which the first peak location is stabilized and the second predetermined period is a period during which the second peak location is stabilized.

4. The method of claim 3, the first predetermined period is when $0<=\mod(sub\_sfn, (M1+M2)*2)<M1$, where M1 and M2 denote corresponding periods for generating the first and second peak locations respectively.

5. The method of claim 4, the second predetermined period is when $M1+M2<=\mod(sub\_sfn, (M1+M2)*2)<2*M1+M2$.

6. The method of claim 1, the analyzing comprising:
   using a training sequence to analyze.

7. The method of claim 6, the analyzing comprising:
identifying statistical response characteristics of the channel impulse responses within the first and second predetermined periods for eliminating noises; and
comparing the channel response characteristics between the first and second predetermined periods for identifying the channel impulse response of a primary path of the mobile terminal.

8. The method of claim 1, the identifying comprising:
identifying one or more multi-path channel impulse responses and their variation ranges.

9. The method of claim 1, the change pattern is unique for all mobile terminals in a cell.

10. A method for determining a channel impulse response estimation window in a current cell for at least one mobile terminal in a neighboring cell, comprising:
presetting, in the neighboring cell, at least two channel impulse response peak locations of respective mobile terminals in first and second predetermined periods with a predetermined peak location change pattern;
upon receiving communication from a mobile terminal, analyzing channel impulse responses using a training sequence to identify the peak location change pattern with regard to first and second peak location;
identifying a variation range for a channel impulse response of a primary path of the mobile terminal; and
determining a channel impulse response estimation window for the mobile terminal based on the identified variation range and a preferred estimation window size,
where the first predetermined period is a period during which the first peak location is stabilized and the second predetermined period is a period during which the second peak location is stabilized,
the presetting comprising:
setting the first peak location as T1 and the second peak location as T2 for a first mobile terminal with T2>T1; and
setting the first and second peak locations for each subsequent mobile terminal alternately based on a relation defined by $(n-1)*W+T2$ and $(n-1)*W+T1$ and a relation defined by $(n-1)*W+T1$ and $(n-1)*W+T2$, where W denotes the preferred estimation window size and n denotes the nth mobile terminal.

11. The method of claim 10, the change pattern is unique to respective mobile terminals provided that the corresponding channel impulse response estimation window is identifiable from neighboring estimation windows.

12. The method of claim 10, the first predetermined period is when a $0<=mod(sub\_sfn, (M1+M2)*2)<M1$, and the second predetermined period is when $M1+M2<=mod(sub\_sfn, (M1+M2)*2)<2*M1+M2$, where M1 and M2 denote corresponding periods for generating the first and second peak locations respectively, and sub_sfn denotes a corresponding subsystem frame number.

13. The method of claim 10, analyzing comprising:
identifying statistical response characteristics of the channel impulse responses within the first and second predetermined periods for eliminating noises; and
comparing the channel response characteristics between the first and second predetermined periods for identifying the channel impulse response of a primary path of the mobile terminal.

14. The method of claim 13, identifying comprising:
identifying one or more multi-path channel impulse responses and their variation ranges.

15. A telecommunication system comprising:
at least one base station servicing a current cell; and
at least one base station servicing a neighboring cell, where one or more mobile terminals from the neighboring cell interfere with communications between one or more mobile terminals of the current cell and the base station servicing the current cell;
where the base stations of the current and neighboring cells configured to preset at least two channel impulse response peak locations of each mobile terminal therein in two or more predetermined periods so that an expected channel impulse response peak for any period rests in one of the two peak locations; and
where upon receiving communication from the mobile terminals, the base station of the current cell is configured to analyze channel impulse responses using a training sequence to identify the peak locations in two or more periods with regard to the mobile terminal from the neighboring cell and determine a channel impulse response estimation window for the mobile terminal,
the base station servicing the current cell configured to identify a variation range for a channel impulse response of a primary path of the mobile terminal, and determine the estimation window based on the identified variation range and a preferred estimation window size,
the base station servicing the current cell configured to preset a first peak location as T1 and a second peak location as T2 for a first mobile terminal with T2>T1, and to set the first and second peak locations for each subsequent mobile terminal alternately based on a relation defined by $(n-1)*W+T2$ and $(n-1)*W+T1$, and a relation defined by $(n-1)*W+T1$ and $(n-1)*W+T2$, where W denotes the preferred estimation window size, and n denotes the nth mobile terminal.

16. The system of claim 15, relative locations of the peak locations for each mobile terminal form a change pattern that is unique to each mobile terminal provided that the corresponding channel impulse response estimation window is identifiable from neighboring estimation windows.

17. The system of claim 15, the two or more predetermined periods including a first predetermined period when a $0<=mod(sub\_sm, (M1+M2)*2)<M1$, and a second predetermined period when $M1+M2<=mod(sub\_sfh, (M1+M2)*2)<2*M1+M2$, where M1 and M2 denote corresponding periods for generating the first and second peak locations respectively, and sub_sfn denotes a corresponding sub system frame number.

18. The system of claim 15, where when analyzing, the base stations servicing the current cell is configured to identify statistical response characteristics of the channel impulse responses within the first and second predetermined periods for eliminating noises; and compare the channel response characteristics between the first and second predetermined periods for identifying the channel impulse response of a primary path of the mobile terminal.

19. A method for performing multi-mobile terminal joint detection, comprising:
determining a channel impulse response estimation window in a current cell for at least one mobile terminal in a neighboring cell;
extracting the channel impulse response for the at least one mobile terminal from the neighboring cell based on the determined channel impulse response estimation window; extracting the channel impulse response for mobile terminals in a current cell; and
performing the multi-mobile terminal joint detection based on the extracted channel impulse response for the at least one mobile terminal from the neighboring cell and the extracted channel impulse response for the mobile terminals in the current cell, determining a channel impulse response estimation window in a current cell for at least one mobile terminal from a neighboring cell comprising:

presetting, in the neighboring cell, at least two channel impulse response peak locations of respective mobile terminals in first and second predetermined periods with a predetermined peak location change pattern;

upon receiving communication from a mobile terminal of the neighboring cell, analyzing channel impulse responses to identify the peak location change pattern with regard to first and second peak locations;

identifying a variation range for a channel impulse response of a primary path of the mobile terminal; and determining a channel impulse response estimation window for the mobile terminal based on the identified variation range and a preferred estimation window size, the change pattern is unique to respective mobile terminals provided that the corresponding channel impulse response estimation window is identifiable from neighboring estimation windows, and the presetting comprising:

setting the first peak location as T1 and the second peak location as T2 for a first mobile terminal with T2>T1; and setting the first and second peak locations for each subsequent mobile terminal alternately based on a relation defined by (n−1)*W+T2 and (n−1)*W+T1 and a relation defined by (n−1)*W+T1 and (n−1)*W+T2, where W denotes the preferred estimation window size and n denotes the nth mobile terminal.

20. The method of claim 19, the first predetermined period is a period during which the first peak location is stabilized and the second predetermined period is a period during which the second peak location is stabilized.

21. The method of claim 20, the first predetermined period is when 0<=mod(sub_sfn, (M1+M2)*2)<M1, where M1 and M2 denote corresponding periods for generating the first and second peak locations respectively.

22. The method of claim 21, the second predetermined period is when M1+M2<=mod(sub_sfh, (M1+M2)*2)<2*M1+M2.

23. The method of claim 19, the analyzing comprising: using a training sequence to analyze.

24. The method of claim 23, the analyzing comprising:
identifying statistical response characteristics of the channel impulse responses within the first and second predetermined periods for eliminating noises; and
comparing the channel response characteristics between the first and second predetermined periods for identifying the channel impulse response of a primary path of the mobile terminal.

25. The method of claim 19, the identifying comprising: identifying one or more multi-path channel impulse responses and their variation ranges.

26. The method of claim 19, the change pattern is unique for all mobile terminals in a cell.

* * * * *